May 6, 1924.
O. CHAPMAN
CLUTCH MECHANISM
Filed July 30, 1923
1,493,244
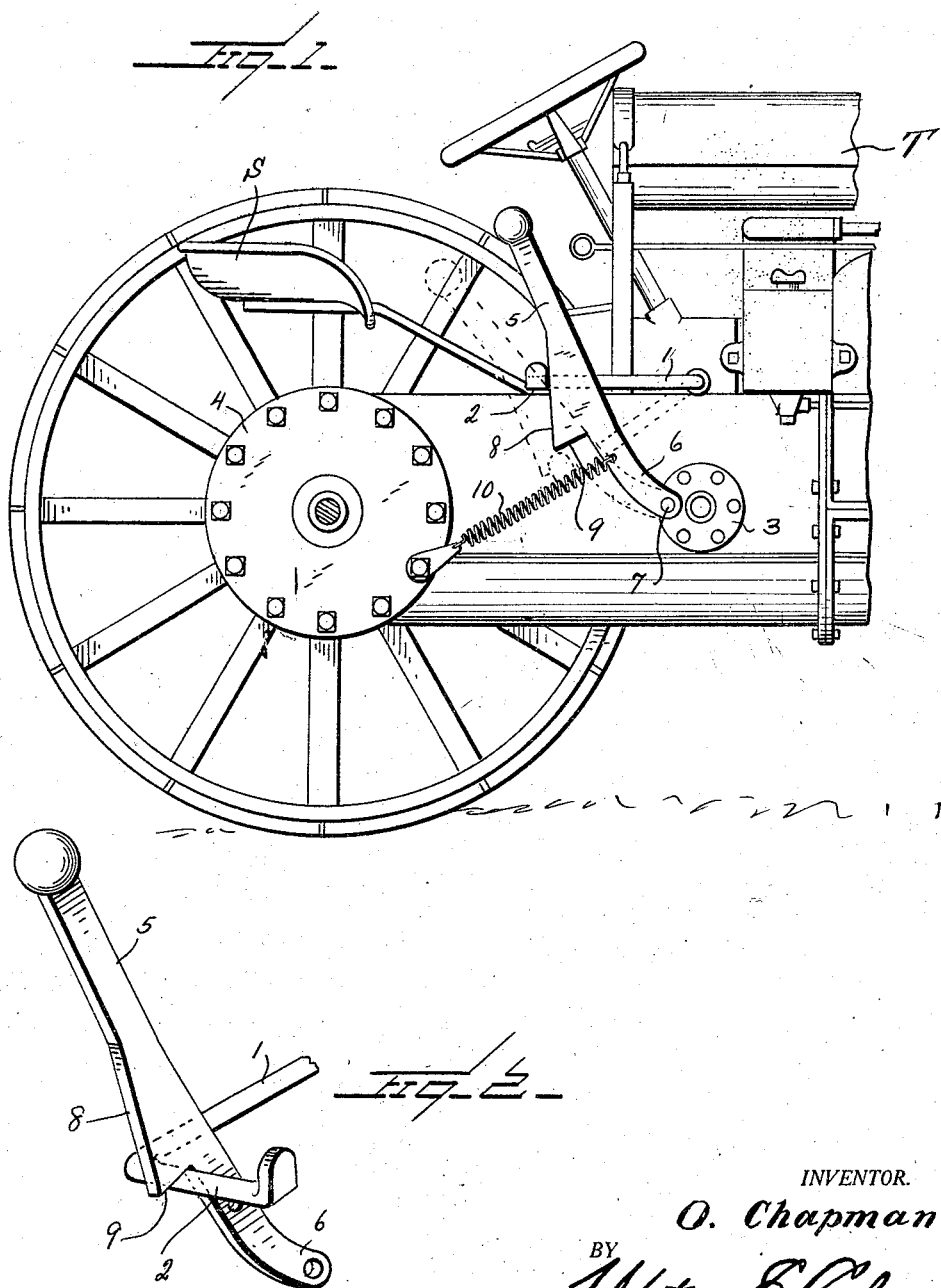
INVENTOR.
O. Chapman
BY Watson E. Coleman
ATTORNEY.

Patented May 6, 1924.

1,493,244

UNITED STATES PATENT OFFICE.

ODAN CHAPMAN, OF BASILE, LOUISIANA.

CLUTCH MECHANISM.

Application filed July 30, 1923. Serial No. 654,649.

*To all whom it may concern:*

Be it known that I, ODAN CHAPMAN, a citizen of the United States, residing at Basile, in the parish of Evangeline and State of Louisiana, have invented certain new and useful Improvements in Clutch Mechanisms, of which the following is a specification, reference being had to the accompanying drawings.

This invention relates to certain improvements in clutch mechanisms and preferably of a type employed in connection with tractors and it is an object of the invention to provide novel and improved means whereby the clutch pedal or operating member may be held in release position.

It is also an object of the invention to provide a novel and improved holding means of this general character which automatically engages the pedal when moved into release position to hold said pedal in such position.

The invention consists in the details of construction and in the combination and arrangement of the several parts of my improved clutch mechanism whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a fragmentary view in side elevation of a tractor illustrating a holding member constructed in accordance with an embodiment of my invention and applied, a second position of the member and the coacting pedal being indicated by broken lines;

Figure 2 is a fragmentary view in perspective illustrating my improved holding member in locking engagement with the pedal.

As disclosed in the accompanying drawings, T denotes a tractor of a well known type and which embodies a clutch lever 1 terminating in a pedal 2; a foot bracket 3 and a rear axle housing 4.

As is well known the lever 1 is adapted to be used when starting and stopping a tractor and when changing gears.

When pressed downward, the lever 1 disconnects the engine from the driving gears and in order to lock or hold the lever 1 in release position I provide the holding member comprising a vertically disposed lever 5 having its lower end portion disposed on a slight forward curvature as at 6. The extremities of said curved portion 6 being pivotally connected as at 7 with the foot bracket 3. The lever 5 is disposed inwardly of the pedal 2 and said lever 5 is provided with a downwardly and rearwardly disposed cam edge 8 providing at its lower end an abrupt shoulder 9.

Secured at one end portion to the lever 5 below the shoulder 9 and at its opposite end to the rear axle housing 4 is a retractible spring 10 which serves to constantly urge the lever toward the pedal 2. When the lever 1 is depressed into release position, the pedal 2 will ride down over the cam edge 8 and as the pedal passes over the high point of said surface, the spring 10 will cause the shoulder 9 to be positioned directly above and in contact with the pedal 2, as indicated by broken lines in Figure 1, whereby the lever 1 is effectively held or locked in release position.

When it is desired to disengage the member 5 from the pedal 2, the same may be manually operated with convenience by the occupant of the seat S.

From the foregoing description it is thought to be obvious that a clutch mechanism constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

In a tractor, the combination with a clutch controlling lever provided with a laterally disposed pedal; of a foot bracket and a rear axle housing, an upstanding holding member having its lower end portion forwardly curved, the extremity of said forwardly curved portion being pivotally connected with the foot bracket, said lever extending above and inwardly of the pedal of the clutch lever, said second named lever above its curved portion being provided with a downwardly and rearwardly disposed cam edge providing an abrupt shoulder at its lower end, and a retractible spring secured to the second lever below the shoulder afforded by the cam and to the axle housing, said spring constantly urging the second lever toward the pedal of the clutch lever, said pedal riding over the cam edge when the clutch lever is depressed, the shoulder of the second lever engaging the pedal from above when the pedal passes over the high point of the cam edge.

In testimony whereof I hereunto affix my signature.

ODAN CHAPMAN.